April 7, 1936. A. F. S. MUSANTE ET AL 2,036,432
APPARATUS FOR DETERMINING CRITICAL TEMPERATURES
Filed Dec. 23, 1933
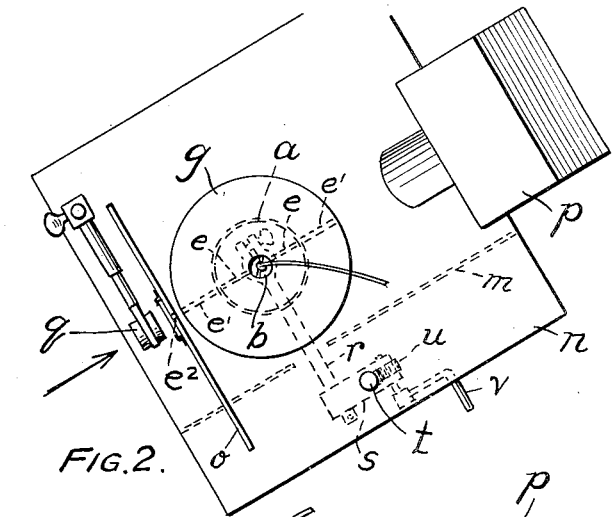
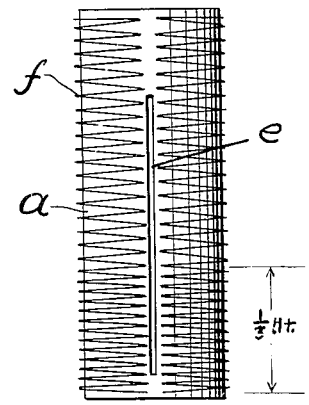
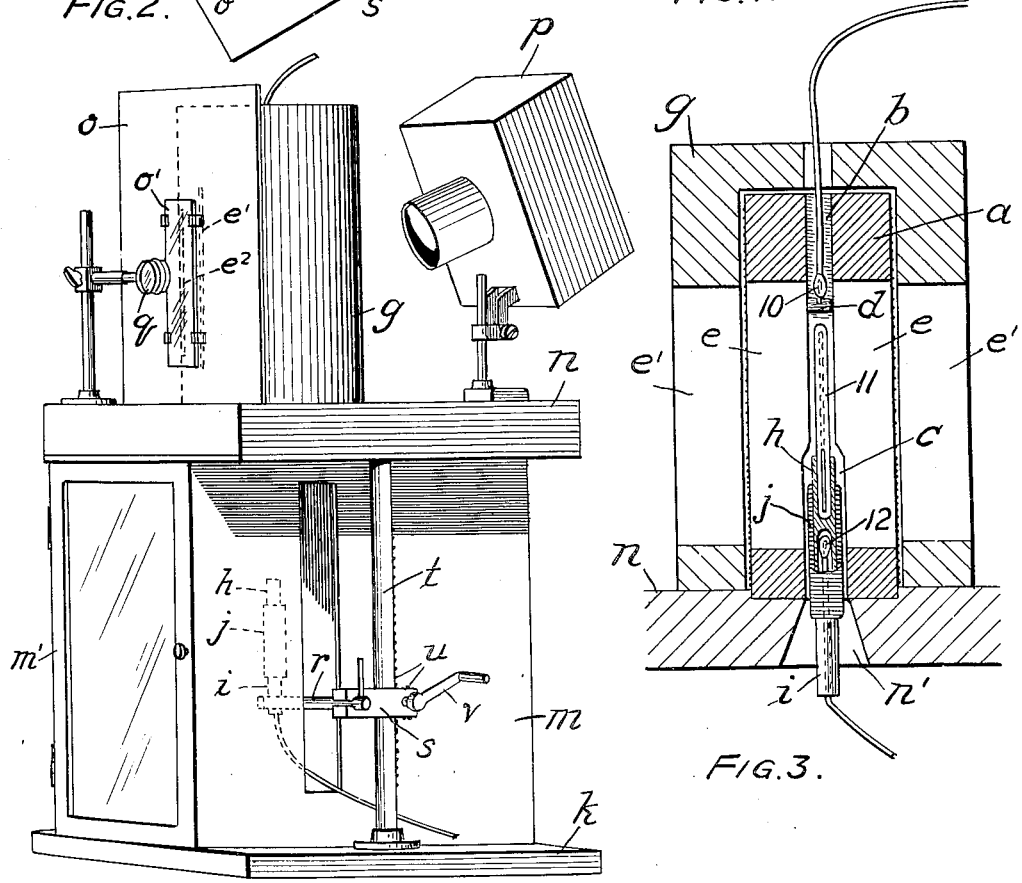
INVENTORS
Augustine Francis Stephen Musante
John Harold Perrine
by
Busser and Harding
ATTORNEYS.

Patented Apr. 7, 1936

2,036,432

UNITED STATES PATENT OFFICE 2,036,432

APPARATUS FOR DETERMINING CRITICAL TEMPERATURES

Augustine Francis Stephen Musante, Media, and John Harold Perrine, Norwood, Pa., assignors to Sun Oil Company, Philadelphia, Pa., a corporation of New Jersey Application December 23, 1933, Serial No. 703,782

13 Claims. (Cl. 73—51)

In an application filed by Gellert Alleman and Augustine Francis Stephen Musante May 13, 1932, Serial No. 611,024, now Patent 1,982,620, there is set forth an apparatus for determining critical temperature, that is, that temperature above which, irrespective of the pressure applied, a substance which is capable of being converted into a gas cannot be liquefied.

The present invention is an improvement on the invention of the said application. It has for its object to shorten the time during which the substance is raised to its critical temperature, and particularly to shorten the time during which, in the case of any substance that starts to crack or decompose before reaching its critical temperature, the substance is raised through such decomposition temperature range to the critical temperature; thereby securing more nearly exact determinations. Other objects are to facilitate manipulation, increase safety and permit the substitution of electric heating means for the gas heated furnace of the earlier application.

A preferred embodiment of the invention, with certain non-inventive details and refinements omitted, is shown in the accompanying drawing, in which—

Fig. 1 is a perspective view of the apparatus.
Fig. 2 is a plan view.
Fig. 3 is a vertical section through the heating block.
Fig. 4 is a diagram of one of the heating elements.

$a$ is a cylindrical block of some material, preferably a metal alloy such as manganese bronze, which will absorb and radiate heat while remaining dark or comparatively dark. The block is provided with wells of restricted diameter, one of which, $b$, extends from the top surface down for the reception of a temperature indicating device, and the other, $c$, of which extends from the bottom surface up for the reception of a tube containing the substance whose critical temperature is to be determined. Conveniently these wells may be formed as a single orifice extending through the center of the block from top to bottom, the orifice being of somewhat greater diameter at its lower end portion than at its central and upper end portion, for a purpose hereinafter described.

It is preferred to separate these wells $b$ and $c$ by means of a partition which is adjustable up and down to vary the relative depths of the wells for purposes hereinafter described. In the specific construction shown, the upper end of the vertical orifice is threaded to receive a threaded plug $d$, which, by means of a screw driver, may be rotated to move it up or down. The upper well $b$ is for the reception of a thermocouple $10$, which is sealed in a short section of a tube. The lower well $c$ is for the reception of a sealed tube $11$ containing the substance whose critical temperature is to be determined.

Aligning vertically extending radial slits $e$ are cut from the outside of the block to the central vertical orifice above described in order that light from an illuminator may pass through the slits and enable the tube $11$ to be observed from a point opposite the illuminator.

Around the block $a$ extends an electric heating unit $f$. It comprises two similar semi-cylindrical sections which, when applied to the block, surround it except for the spaces occupied by the mouths of the slits $e$. The electrical heating unit may be of any suitable material or shape, but is preferably of ribbon form having a resistance of about 0.420 ohms per foot. Its ends connect with suitable terminals not shown. The block $a$, with the surrounding heating element $f$, is insulated from the outside air by means of a cylindrical heat insulating cover or shield $g$, such as asbestos pipe covering, which is provided with vertical radial slits $e'$ adapted to register with slits $e$. The heating coils may be covered, inside and outside, with sheets of mica (not shown), and the thus insulated coils may be enclosed in a metal alloy shell (not shown) to hold them firmly in position.

The tube $11$ containing the substance whose critical temperature is to be determined is adapted to be held, at its lower end, in a cup $h$ supported in the upper end of a rod $i$ having an axial bore, extending from the lower end of the rod to within a very short distance of the bottom of the cup, for the reception of a thermocouple $12$. The central part and upper end of the rod is heated by means of electric resistance wire $j$, which is insulated, inside and out, by means, for example, of mica, asbestos and alundum cement (not shown).

Heating block $a$ and its cover $g$ rest on a housing which may be constructed as follows: $k$ is a wooden base covered with transite, upon which rests a box $m$, made preferably of sheet iron, provided with a hinged door $m'$ having a glass window. The box $m$ supports a floor $n$ composed, preferably, of a metal plate covered with layers of sheet asbestos and transite, on which the heating block $a$ and its cover $g$ are suitably supported. Also supported on floor $n$ is a metal shield o, between the block and the intended position of the observer. The shield is provided with a vertically extending slot $e^2$, aligning with slits $e$ and $e'$. A piece of polished glass $o'$ is fitted over the slot $e^2$. This shield gives additional protection to the operator, in case of explosion. In the rear of the block is an adjustable micro lamp $p$ provided with a focusing condensing lens in order to throw its light rays through the slits $e$, $e'$, $e^2$ and thus illuminate the critical temperature tube. In front of the observation window $o'$ is positioned any optical device $q$ that will aid observation, such as a planar objective.

The tube-holder, comprising the above described cup $h$ and rod $i$, is carried by a horizontally extending arm $r$, which is supported by and turnable (on its own axis) in a block $s$, movable on a post $t$. The block $s$ is conveniently adjustable on post $t$ by means of a rack and pinion $u$, the latter being rotatable by means of a crank arm $v$. The tube holder $h$, $i$ and heating element $j$ may thus be moved from within the box $m$ up through the funnel-shaped opening $n'$ in the floor $n$ into operative relation with the heating block $a$. When the holder and tube are lowered into the box $m$, arm $r$ may be turned on its horizontal axis through an arc of (say) 120° to quickly discharge the tube.

It will be observed, by reference to Fig. 4, that the coils or turns of the wire or ribbon of the electric heating unit $f$ are more closely approximated in the lower part of the unit than in its upper part. This merely diagrammatically illustrates the fact that the unit $f$ is so constructed that its lower portion, say about the lower one-third, is hotter than the upper portion, so that the temperature of the lower part of the block $a$ is slightly above that of its upper portion; the purpose being to apply a slightly greater degree of heat to the lower portion of the tube containing the substance whose critical temperature is to be determined than to the upper portion of said tube. A serious objection to the use of an ordinary electric heating unit for heating the block $a$ is that it tends to heat the contents of the tube $11$ uniformly. When the material contained in the tube is uniformly heated the loss due to evaporation equals the expansion due to heating, the meniscus does not rise and it is found difficult or impossible to observe exactly when the meniscus disappeared. With the slightly differential heating described the expansion due to heating exceeds the loss due to evaporation and the meniscus rises to near the top of the tube and its instant of disappearance can be determined with certainty and accuracy.

Another important feature of the described construction is the means for varying the relative heights or depths of the wells $b$ and $c$. Before making a determination, the screw plug $d$ is adjusted in accordance with the approximate critical temperature of the substance whose exact critical temperature is to be determined. Such approximate critical temperatures are usually known, or can be more or less closely estimated, or can be ascertained by a rough preliminary determination. The lower the critical temperature of the substance the farther down the plug should be positioned. For instance, in the determination of propane (critical temperature 95.6 C.) the plug must be positioned about one inch below the position which will give an accurate reading for the determination of the critical temperature of diphenyl (495.6° C.). The correct positions for the plug in order to determine the critical temperatures of different substances are calculated after ascertaining the positions at which accurate results are secured in determining the critical temperatures of substances, such as benzene, diphenyl, n-pentane and other compounds whose critical temperatures have been determined by the most expert investigators.

In operation the block $a$ is heated to a temperature within 25 or 50° C. of the critical temperature of the sample to be tested. If this critical temperature is not approximately known, or cannot be estimated, the information can be secured by a preliminary rough determination. The temperature of the block $a$ is ascertained by means of the thermo-element $10$. The tube holder $h$, $i$, while in the box $m$, is heated to a temperature just below the temperature at which the substance to be tested will start to crack. The temperature of the holder is ascertained by means of the thermo-element $12$. After the substance in tube $11$ is heated to this temperature, the holder $h$, $i$ is raised, by the means above described, so as to enter it into the well $c$ in about the position shown in Fig. 3, or somewhat above or below that position dependent upon the position to which plug $d$ has been adjusted. The block $a$ and tube holder $h$, $i$ are then both rapidly heated and the temperature of the block at the instant the meniscus disappears is observed. This is the critical temperature of the substance.

The temperatures are read on indicating potentiometers (not shown). The most accurate pontentiometers are calibrated for a 0° C. cold junction, which is provided by inserting the thermocouple junction in a Dewar flask maintained at 0° C. with cracked ice. A known accurate commercial potentiometer which we have found satisfactory is one having a scale which reads to 870° C., the length of which is such that there are 9 degree marks per inch, making it easily readable to within at least 0.25° C. Appropriate resistances are connected in series with the heating units in order to regulate the heat. These instruments are of a standard type and therefore require no illustration or detailed description. The observations should be made in a dark room.

By means of the described apparatus it is possible to heat the material whose critical temperature is being determined throughout that part of its cracking range below its critical temperature more rapidly than with any other apparatus of which we have knowledge. As stated by Alleman and Musante, in the description of their apparatus, in the determination of the temperature of medium and high boiling mineral oil hydrocarbons, not over three minutes should elapse from the time the material reaches the temperature at which it starts to decompose until it reaches its critical temperature. It is often difficult with the Alleman and Musante apparatus and still more difficult, or impossible, with any other critical temperature determination apparatus known to us, to raise the temperature through this range within three minutes. With our improved apparatus, it is always possible to raise the temperature through this range within three minutes and it is usually possible to reduce this period to less than two minutes.

It will be understood that the capacity of the apparatus to accurately determine critical temperatures finds its most useful application in the determination of the critical temperature of those compounds, such as medium and high boiling petroleum hydrocarbons, whose cracking temperatures are materially below their critical temperatures. In the case of many compounds which do not start to decompose until they reach a temperature above, or slightly below, their critical temperatures, the latter may be fairly accurately determined with known critical temperature determination devices; and the use of our improved apparatus is of advantage chiefly because of the rapidity with which the operation may be conducted. In the case of the multitude of hydrocarbon compounds constituting crude (uncracked) petroleum, the general rule, subject to some exceptions, is that the higher the critical temperature of the hydrocarbon, the lower the temperature at which it starts to crack. The low boiling hydrocarbons have, as a rule, low critical temperatures and high cracking temperatures, and hence a determination of their critical temperatures can be made with fair accuracy with known critical temperature determination devices wherein the time element is not a serious factor. With higher boiling hydrocarbon mixtures, however, whose critical temperatures are relatively high and whose cracking temperatures are relatively low, the time factor becomes important, because of the wider temperature range between the lowest effective cracking temperature and the critical temperature and the greater time required to heat the substance through such range. It will be readily understood, therefore, why rapidity of heating through a limited range under the critical temperature is of great importance. By means of our apparatus this heating may be effected so rapidly that it has been found possible to ascertain the critical temperature of many high boiling hydrocarbons with an accuracy that has heretofore been found impossible. That such accuracy is obtained is demonstrated by quickly withdrawing and cooling the tube, after the determination has been made, and making another determination. The two determinations are always in such close agreement as to preclude the existence of effective cracking in either determination.

The described apparatus is capable of easy manipulation. In case of explosion, since a metal plug seals the top of well $c$, all glass drops into the protected housing below. The operator is fully protected, since no fragments of glass can reach him.

Electric heating avoids the undesirable fumes due to gas combustion, and while electric heating is not new with us, it is believed that the method of, and means for, electric heating herein described are not only novel, but are the first to overcome the objections to pre-existing electric heating arrangements.

What we claim and desire to protect by Letters Patent is:

1. An apparatus for determining the critical temperature of a substance comprising a cylindrical block adapted to receive and transmit heat and provided with an axial orifice for the reception of a tube holding said substance and of a thermal element, an electric heating element surrounding the block and comprising resistance conductor windings of such characteristics as to impart a predetermined and uniform temperature to the axial part of the block along a zone of a predetermined length in a vertical direction, and means to position one below the other, in said axial orifice and within said zone, the upper part of the tube and said thermo element, thereby insuring that the thermo element will record the temperature at the meniscus notwithstanding its different vertical positions and its variable height.

2. A critical temperature determination apparatus comprising a block provided with a well for the substance whose critical temperature is to be determined, and an electric heating element substantially surrounding the block and comprising resistance conductor windings of such differential characteristics in their upper and lower portions as to be adapted to impart to the lower part of the substance a predetermined temperature appreciably and predeterminably higher than that imparted to the upper part of the substance.

3. An apparatus for determining the critical temperature of a substance, comprising a cylindrical block adapted to receive and transmit heat and provided with an axial orifice for the reception of a tube holding said substance and of a thermo element above the tube, and an electric heating element surrounding the block and comprising resistance conductor windings of such differential characteristics as to impart a predetermined temperature to a zone adapted to surround the lower part of the substance and another and predeterminably lower temperature to a higher zone of a predetermined vertical extension, thereby insuring obtaining the actual critical temperature notwithstanding variations in the height of the meniscus.

4. A critical temperature determination apparatus comprising a block of a material adapted to absorb and transmit heat and provided with a well of restricted cross-sectional area opening in its lower face for the reception of the substance whose critical temperature is to be determined and a well of restricted cross-sectional area opening in its upper face, and substantially aligning with the well in its lower face, for the reception of a thermo element, and means to transmit a substantially uniform heat to the part of the block enclosing the lower part of the upper well and the upper part of the lower well.

5. A critical temperature determination apparatus comprising a block of a material adapted to absorb and transmit heat and provided with a well of restricted cross-sectional area opening in its lower face for the reception of the substance whose critical temperature is to be determined and a well of restricted cross-sectional area opening in its upper face, and substantially aligning with the well in its lower face, for the reception of a thermo element, a partition separating the approximating ends of said wells, and means to heat the block.

6. A critical temperature determination apparatus comprising a block of a material adapted to absorb and transmit heat and provided with a well of restricted cross-sectional area opening in its lower face for the reception of the substance whose critical temperature is to be determined and a well of restricted cross-sectional area opening in its upper face, and substantially aligning with the well in its lower face, for the reception of a thermo element, means to heat the block to thereby transmit heat to said wells, and a partition separating the approximating ends of said wells and adjustable to vary the relative depths of the two wells.

7. A critical temperature determination apparatus comprising a block of a material adapted to absorb and transmit heat and provided with a well of restricted cross-sectional area opening in its lower face, a tube holder, means to heat the block, means to heat the tube holder, the latter being movable from a point below the block through said opening into said well, whereby the substance may be first heated outside the block to a predetermined temperature and may then be raised to its critical temperature within the block.

8. A critical temperature determination apparatus comprising a block of a material adapted to absorb and transmit heat, a holder for the substance whose critical temperature is to be determined, said holder comprising a cup adapted to hold a tube containing said substance and having a recess for the reception of a thermo element, means to heat the holder, the block having a well adapted to receive the holder and the holder being movable into and out of said well, and means to heat the block.

9. A critical temperature determination apparatus comprising a block of a material adapted to absorb and transmit heat, a holder for the substance whose critical temperature is to be determined, said holder comprising a cup adapted to hold a tube containing said substance and having a recess for the reception of a thermo element, means to heat the holder, the block having a well adapted to receive the holder and a well adapted to receive a thermo element, the holder being movable into and out of the first named well, and means to heat the block.

10. A critical temperature determination apparatus comprising an enclosure, a holder for the substance whose critical temperature is to be determined adapted to transmit heat to said substance, another device for transmitting heat to said substance mounted upon said enclosure, and means to support said holder within the enclosure and to move it upward into heat-receiving relation with said device.

11. A critical temperature determination apparatus comprising a tube-holding cup, a rod supporting said cup provided with a bore for the reception of a thermo element, an electric heating unit surrounding the rod, a block adapted to receive and transmit heat, and provided with a well into and out of which said rod and cup are movable, and an electric heating element enclosing the block.

12. In an apparatus for determining the critical temperature of a substance, comprising a cylindrical block adapted to receive and transmit heat and to receive within it a tube holding said substance and a thermo element and a cylindrical cover of sheet insulating material enclosing the block, the block and heating element being provided with longitudinally and radially extending slits; the improvement which comprises an electric heating element inserted between the block and the surrounding cover, said heating element comprising two similar approximately semi-cylindrical conductor resistance windings whose diametrically opposite approximating edges are spaced apart so as to leave uncovered the slits in the block.

13. An apparatus for determining the critical temperature of a substance, comprising a cylindrical block adapted to receive and transmit heat and provided with an axial orifice adapted to receive a tube holding said substance and a thermo element, said block being provided with longitudinally and radially extending slits intersecting said orifice, an electric heating element surrounding the block except opposite the slits, a cylindrical cover of sheet insulating material enclosing the block and heating element and provided with longitudinally and radially extending slits adapted to align with the slits in the block, a tube holder having an orifice adapted to receive a thermo element, and an electric heating element surrounding the holder, said holder being movable into and out of the orifice in the block.

AUGUSTINE FRANCIS
STEPHEN MUSANTE.
JOHN HAROLD PERRINE.